(12) United States Patent
Hirata et al.

(10) Patent No.: US 7,210,797 B2
(45) Date of Patent: May 1, 2007

(54) PROJECTOR OPTICAL UNIT, PROJECTION TYPE IMAGE DISPLAY APPARATUS, AND REAR PROJECTION TYPE IMAGE DISPLAY APPARATUS

(75) Inventors: Koji Hirata, Tokyo (JP); Shuji Kato, Yokohama (JP); Masahiko Yatsu, Fujisawa (JP); Tsutomu Nakashima, Yokohama (JP); Hidehiro Ikeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 10/865,643

(22) Filed: Jun. 9, 2004

(65) Prior Publication Data

US 2005/0036120 A1   Feb. 17, 2005

(30) Foreign Application Priority Data

Aug. 11, 2003  (JP) .............................. 2003-207007

(51) Int. Cl.
  G03B 21/26    (2006.01)
  G03B 21/28    (2006.01)
  G03B 21/56    (2006.01)
  G02B 3/00     (2006.01)
  G02B 13/22    (2006.01)
  H04N 5/74     (2006.01)
  G02F 1/1335   (2006.01)

(52) U.S. Cl. .......................... 353/102; 353/31; 353/34; 353/37; 353/81; 353/98; 359/460; 359/649; 359/663; 348/757; 349/7

(58) Field of Classification Search ................ 353/102, 353/20, 31, 33, 34, 37, 71, 74, 76–79, 81, 353/82, 84, 98, 99; 359/433, 434, 443, 453, 359/456, 460, 649–652, 663; 348/739, 744, 348/750, 757; 349/5, 7–9
See application file for complete search history.

(56) References Cited

U.S. PATENT DOCUMENTS

| 5,692,820    | A  | * | 12/1997 | Gale et al. .................... 353/77 |
| 6,094,311    | A  |   | 7/2000  | Moskovich |
| 6,375,330    | B1 |   | 4/2002  | Mihalakis |
| 7,009,765    | B2 | * | 3/2006  | Gohman ..................... 359/434 |
| 2001/0019454 | A1 | * | 9/2001  | Tadic-Galeb et al. ....... 359/649 |

FOREIGN PATENT DOCUMENTS

| GB | 2343966 A    | 5/2000  |
| JP | 05-134213    | 5/1993  |
| JP | 06-265814    | 9/1994  |
| JP | 2000-155373 A| 6/2000  |
| JP | 2000-162544  | 6/2000  |
| JP | 2001-350132 A| 12/2001 |
| JP | 2002-357768  | 12/2002 |
| JP | 2003-121881 A| 4/2003  |

* cited by examiner

Primary Examiner—W. B. Perkey
Assistant Examiner—Rochelle Blackman
(74) Attorney, Agent, or Firm—Townsend and Townsend and Crew LLP

(57) ABSTRACT

In a projection type image display apparatus, a projector optical unit for projecting an image onto a screen while magnifying a size of the image to be projected with respect to an original size of the image displayed by an image forming element, has a group of lenses for magnifying the size of the image with respect to the original size thereof, and an optical path extending from the image forming element to the screen to transmit the image along the optical path.

32 Claims, 15 Drawing Sheets

FIG.9

| FACE | CURVATURE RADIUS (mm) | DISTANCE BETWEEN FACES (mm) | HYALINE MATERIAL |
|---|---|---|---|
| Sa0 | INFINITY | 2.5 | '1737' |
| Sa1 | INFINITY | 1 | AIR |
| Sa2 | INFINITY | 0.7 | 'B270' |
| Sa3 | INFINITY | 10 | 'GE55' |
| Sa4 | INFINITY | 1.555 | 'B270' |
| Sa5 | INFINITY | 14 | 'GE55' |
| Sa6 | INFINITY | 24 | BACD18 HOYA |
| Sa7 | INFINITY | 2.23 | AIR |
| Sa8 | 46.231 | 5.798 | LAC10 HOYA |
| Sa9 | -50.5259 | 0.268 | AIR |
| Sa10 | 22.5761 | 5.129 | LAC14 HOYA |
| Sa11 | 64.5372 | 4.126 | AIR |
| Sa12 | -72.2431 | 4.415 | FD60 HOYA |
| Sa13 | 16.682 | 3.278 | AIR |
| Sa14 | INFINITY | 4.616 | AIR |
| Sa15 | -11.0588 | 2.007 | FD60 HOYA |
| Sa16 | -28.6349 | 4.46 | LAC10 HOYA |
| Sa17 | -15.719 | 0.268 | AIR |
| Sa18 | 508.848 | 4.795 | NBFD3 HOYA |
| Sa19 | -31.462 | 157.417 | AIR |
| Sa20 | 82.8636 | 13.5 | TAC8 HOYA |
| Sa21 | INFINITY | 4.495 | AIR |

FIG.12

| FACE | CURVATURE RADIUS (mm) | DISTANCE BETWEEN FACES (mm) | HYALINE MATERIAL |
|---|---|---|---|
| Sb0 | INFINITY | 27.727 | AIR |
| Sb1 | 22176.9 | 9.5 | 'PMMA25' |
| Sb2 | -57.1031 | 0.5 | AIR |
| Sb3 | 163.807 | 2.5 | FDS90 HOYA |
| Sb4 | 34.3457 | 17.275 | FC5 HOYA |
| Sb5 | -679.685 | 0.5 | AIR |
| Sb6 | 48.347 | 14 | BACD5 HOYA |
| Sb7 | -183.155 | 0.65 | AIR |
| Sb8 | 27.8409 | 7.464 | BSC7 HOYA |
| Sb9 | 20.8326 | 8.840 | AIR |
| Sb10 | 26.7083 | 13.516 | BSC7 HOYA |
| Sb11 | -364.105 | 9.121 | AIR |
| Sb12 | INFINITY | 6.272 | AIR |
| Sb13 | 31.1946 | 3 | BSC7 HOYA |
| Sb14 | 32.3414 | 9.716 | AIR |
| Sb15 | -21.6645 | 2 | 'PMMA25' |
| Sb16 | -70.9357 | 14.439 | AIR |
| Sb17 | -29 | 3.5 | BSC7 HOYA |
| Sb18 | -41.1679 | 14.116 | AIR |
| Sb19 | -20.1366 | 10 | 'PMMA25' |
| Sb20 | -37.2281 | 425 | AIR |

| FACE | CONE CONSTANT CC | AE | AF | AG | AH | AI |
|---|---|---|---|---|---|---|
| Sb1 | -3.10E+28 | -4.93E-06 | -7.65E-09 | 1.81E-11 | -6.80E-15 | -1.96E-18 |
| Sb2 | -1.18626412 | -5.75E-07 | -6.82E-09 | 1.20E-11 | -3.00E-15 | -2.09E-18 |
| Sb15 | 1.084670938 | -6.16E-06 | 9.58E-08 | -1.22E-09 | 7.16E-12 | -1.84E-14 |
| Sb16 | 5.904507011 | 5.02E-06 | -5.05E-09 | 1.54E-11 | -5.09E-14 | 7.14E-17 |
| Sb19 | -2.085899912 | 8.64E-07 | -2.27E-10 | 8.16E-14 | -1.48E-17 | 6.45E-22 |
| Sb20 | -5.931655051 | -7.88E-07 | 4.57E-11 | -2.09E-13 | 6.55E-17 | -1.29E-20 |

$$Z = \frac{r^2 / RD}{1 + SQR(1 - (1 + CC) r^2 / RD^2)} + AE \cdot r^4 + AF \cdot r^6 + AG \cdot r^8 + AH \cdot r^{10} + AI \cdot r^{12}$$

Change (OBJ=0.7"wide ; M=3.0)

wide-projection Lens

PROJECTOR OPTICAL UNIT, PROJECTION TYPE IMAGE DISPLAY APPARATUS, AND REAR PROJECTION TYPE IMAGE DISPLAY APPARATUS

BACKGROUND OF THE INVENTION

The present invention relates to a projection type image display apparatus in which an enlarged image is projected on a screen to perform an image display, a rear projection type image display apparatus in which the enlarged image is projected on a rear surface of the screen, and a projector optical unit usable in these display devices.

JP-A-5-134213 (document 1), JP-A-2000-162544 (document 2) and JP-A-2002-357768 (document 3) disclose projector optical units in each of which an image is projected onto a screen in a direction oblique to the screen so that a sufficiently enlarged size of the image is obtained on the screen with a short projecting distance.

BRIEF SUMMARY OF THE INVENTION

An object of the present invention is to provide a projection type image display apparatus and a projector optical unit usable in the projection type image display apparatus, by which a size, for example, a length (depth) of the projection type image display apparatus in a direction perpendicular to a horizontal direction of a screen of the projection type image display apparatus can be decreased.

According to the present invention, a projector optical unit for projecting an image onto a screen while magnifying a size of the image to be projected with respect to an original size of the image displayed by an image forming element, comprises, a group of lenses for magnifying the size of the image with respect to the original size thereof, and an optical path extending from the image forming element to the screen to transmit the image along the optical path.

It is preferable for decreasing a size of a projection type image display apparatus using the projector optical unit that the group of lenses (preferably positively-refractile) includes a first part group of lenses for magnifying the size of the image to a first size of the image enlarged with respect to the original size thereof, and a second part group of lenses for magnifying the size of the image to a second size of the image enlarged with respect to the first size thereof.

It is preferable for increasing a field angle projected from the second part group of lenses to decrease the size of a projection type image display apparatus that an image focus location at which the image of the first size is capable of being formed is arranged between the first and second part groups of lenses, and/or that the group of lenses, particularly the first part group of lenses forms a telecentric optical system (suitable for F value of irradiating optical system) between the group of lenses and the image forming element. F2=F1/M1 when F2 is F value (diverging angle of light beam) of the second part group of lenses, F1 is F value of the first part group of lenses, and M1 is a magnifying power of the first part group of lenses for forming the image of the first size. Therefore, F2 can be of great value preferable for the field angle not less than 90 degrees.

The first part group of lenses may be detachably connected to the second part group of lenses so that various types of the first part group of lenses can be attachable to the second part group of lenses. The image of the second size may be an erect image with respect to the image of the original size displayed by the image forming element.

It is preferable for decreasing a horizontal length of the projection type image display apparatus in a direction perpendicular to a horizontal direction of a screen of the projection type image display apparatus that the optical path is deflected between the screen and the image forming element.

It is preferable for setting freely each of the magnifying powers of the first and second part groups of lenses that at least two image focus locations at each of which the image of respective one of the first and second sizes is capable of being formed are arranged along the optical path.

If an optical axis of the second part group of lenses is prevented from passing a radially central position of the image of the first size corresponding to a radially central position of the image to be projected on the screen as seen in a direction parallel to the optical axis of the second part group of lenses, a radially central position of the image of the second size is prevented from being formed on the optical axis of the second part group of lenses so that a position of the radially central position of the image of the second size can be adjustable with respect to the optical axis of the second part group of lenses to decrease the horizontal length of the projection type image display apparatus in the direction perpendicular to the horizontal direction of the screen of the projection type image display apparatus. In this case, it is further preferable for decreasing the horizontal length of the projection type image display apparatus that the optical axis of the second part group of lenses is deflected between the first and second part groups of lenses. It is preferable for preventing the optical axis of the second part group of lenses from passing the radially central position of the image of the first size that the optical axis of the second part group of lenses is prevented from passing or crossing an optical axis of the first part group of lenses as seen in a direction parallel to each of the optical axes of the first and second part group of lenses, and/or that the optical axis of the first part group of lenses is prevented from passing or crossing a radially central position of the image of the original size corresponding to a radially central position of the image to be projected on the screen as seen in a direction parallel to the optical axis of the first part group of lenses while the optical axes of the first and second part groups of lenses may be coaxial with respect to each other, and/or the optical axes of the first and second part groups of lenses may be deflected between the first and second part groups of lenses.

It is preferable for making a difference between magnifying power between the first and second part groups of lenses (for example, increasing the magnifying power of the second part group of lenses in comparison with the magnifying power of the first part group of lenses) that the group of lenses further includes a field lens (preferably positively-refractile) between the first and second part groups of lenses for introducing the image of the first size into the second part group of lenses. The image focus location at which the image of the first size is capable of being formed may be arranged between the field lens and the first part group of lenses or between the field lens and the second part group of lenses. If the field lens includes a plurality of lenses, the image focus location may be arranged between the lenses of the field lens. If the image focus location at which the image of the first size is capable of being formed is arranged between the field lens and the first part group of lenses, a contaminant on or in the field lens is prevented from affecting the image projected on the screen. It is preferable for decreasing the horizontal length of the projection type image display apparatus that the optical path is deflected between the field lens and the second part group of lenses.

The group of lenses may include at least one of a total reflection mirror and a prism for deflecting the optical path between the field lens and the second part group of lenses.

It is preferable for increasing the field angle projected from the second part group of lenses to, for example, not less than 90 degrees that the magnifying power of the first part group of lenses is smaller than the magnifying power of the second part group of lenses.

The projector optical unit may further comprise a light source for emitting a luminous flux so that the image of the original size is irradiated by the luminous flux to be projected onto the screen while a luminous intensity of the luminous flux applied to each pixel of the image forming element is adjustable in accordance with an amplitude of an image signal. The light source is capable of generating red, green and blue luminous fluxes. The light source may include a white light source, a luminous divider for dividing the white light to red, green and blue luminous fluxes to irradiate respective image forming element parts of the image forming element, and the unit further comprises an image combining device for combining red, green and blue images formed by the respective image forming element parts to form the image of the original size. The white light source may include one of an ultra-high pressure mercury lamp, a xenon lamp, and a metal halide lamp.

According to the present invention, a rear projection type image display apparatus comprises, an image forming element for forming an image of original size, an optically transmissive screen for displaying the image thereon, and a projector optical unit for magnifying a size of the image with respect to the original size of the image and projecting the image of the magnified size onto a rear surface of the screen.

It is preferable for setting freely the magnifying power of each of the first and second part groups of lenses that in the rear projection type image display apparatus, the projector optical unit includes the first part group of lenses for magnifying the size of the image to the first size of the image enlarged with respect to the original size thereof, and the second part group of lenses for magnifying the size of the image to the second size of the image enlarged with respect to the first size thereof to be projected onto the screen, and the image focus location on which the image of the first size is capable of being formed is arranged between the first and second part groups of lenses. It is preferable for increasing the field angle projected from the second part group of lenses to, for example, not less than 90 degrees that the magnifying power of the first part group of lenses is smaller than the magnifying power of the second part group of lenses. It is preferable that the first part group of lenses forms a telecentric optical system between the first part group of lenses and the image forming element.

It is preferable for decreasing the horizontal length of the projection type image display apparatus that the optical axis of the first part group of lenses is arranged parallel to a horizontal direction of the screen. It is preferable that the image forming element is capable of adjusting luminous intensities of respective three primary colors in accordance with an image signal to be applied to each pixel of the image forming element, and a luminous flux corresponding to the image is reflected by a mirror to be projected onto the rear surface of the screen.

It is preferable for decreasing the horizontal length of the projection type image display apparatus that the projector optical unit includes a first optical unit for guiding a luminous flux corresponding to the image in a direction parallel to a horizontal direction of the screen, a mirror for deflecting the luminous flux to proceed in another direction perpendicular to the horizontal direction of the screen, and a second optical unit for projecting the luminous flux deflected by the mirror onto the screen to form the image of magnified size on the screen.

An image projection oblique to a screen causes a so-called trapezoid distortion of a projected image. For solving this problem, in the projection optical unit disclosed by the document 1, an afocal converter arranged at a screen side is decentered to restrain the trapezoid distortion. Since the afocal converter disclosed by the document 1 has low magnification power, it is difficult for a projection angle to be made wide. Further, in the projection optical unit disclosed by the document 2, it is difficult for the projection angle to be increased for making a rear projection type color image display apparatus sufficiently thin. Further, it includes a problem of that since decentering each of used lenses is necessary, a production thereof is difficult. Further, a projection optical unit disclosed by the document 3 has a first system of refractor lenses of positive power, a second system of refractor lenses of negative power, and an optical path deflecting mirror, and at least two of the refractor lenses of the second system of negative power are different in rotational symmetry from each other to form an eccentric system. Therefore, it is difficult for positioning accuracy of each of the lenses to be maintained when being produced.

Further, in the prior art, designing is brought about with focusing attention on only the projection optical unit, and an optimum designing over the whole system including an irradiating optical system has not been brought about.

As problems in the projection optical unit usable in the conventional color image display apparatus having a transmissive liquid crystal panel as an image forming element, the following problems other than increasing the field angle necessary for making the set compact, for example, increasing of focusing accuracy corresponding to increasing resolution of the panel, and increasing the magnification power corresponding to downsizing of the panel and the color image display apparatus, exist.

On the other hand, when a reflection type liquid crystal panel is used as the image forming element, pixel electrodes may be arranged at a reverse surface of a liquid crystal layer to obtain high open area ratio. Therefore, it has the following advantages in comparison with the transmissive type liquid crystal panel.
(1) A size of the panel can be decreased while keeping the resolution constant.
(2) A number of pixels can be increased (the resolution can be increased) while keeping the size of the panel constant.

Therefore, a projection lens device usable in the color image display apparatus including the reflection type liquid crystal panel can have further increased resolution and further increased magnification power in comparison with the reflection type liquid crystal panel. Further, in an optical system of an image projection apparatus including the reflection type liquid crystal panel, since a great air gap as well as a prism for combining colors exist between the image forming element and the projection lens device, a further increased length of back focusing is necessary.

Further, in the projection type color image display apparatus, since the projection optical unit is designed and developed in accordance with an effective size of an image forming area of the panel, a developing cost needs to be high.

As described above, in the rear projection type color image display apparatus, the projection optical unit having the wide field angle, high focusing accuracy, high magnification power and long back focusing length is necessary for decreasing the size thereof. Further, it is preferable that when the effective size of the image forming area and the type of the panel are changed, only a part of standard element needs to be modified without designing and developing the whole of the irradiating system and the projection optical unit, so that the cost for developing is decreased.

The present invention is provided to solve these problems, and an object of the invention is to provide a technique for obtaining the set of decreased size.

For solving the above problems, according to the invention, a first positively-refractile lens group for forming a first enlarged image and a second positively-refractile lens group arranged at a screen side of the first lens group to further enlarge the first enlarged image to form a second enlarged image on a screen are arranged in the optical path between the image forming element and the screen, while the first enlarged image is formed at an image forming element side with respect to the second lens group.

Further, a positively-refractile field lens group may be arranged between the first and second lens groups so that the magnification power M1 for forming the first enlarged image is made smaller than the magnification power M2 for forming the second enlarged image. Further, the first lens group may be telecentric at the image forming element side while being designed in accordance with F value of the irradiating optical system.

The first enlarged image is formed by the first lens group at the image forming element side with respect to the second lens group. Therefore, F2 (diverging angle of luminous flux) as the F value of the second lens group is calculated along a formula F2=F1 /M1 when F1 is F value of the first lens group, and M1 is the magnification power for forming the first enlarged image. Therefore, F2 of the second lens group can be great to be advantageous for the ultra-wide field of projection with the field angle more than 90 degrees.

Further, the first enlarged image formed by the first lens group is formed in the vicinity of the field lens group. For example, when it is formed at a first lens group side, the enlarged image on the screen is not deteriorated irrespective of contaminant in the field lens group.

Further, a first means for decreasing a size of the projection type color image display apparatus is as follows.
(1) An optical path deflecting means is arranged between the second lens group and the field lens. This optical path deflecting means may be a prism as a concrete technical means, and when a mirror is used, a cost is decreased and a size thereof can be small.
(2) Further, the optical path deflecting means is arranged between the lenses of the first lens group.
(3) Further, the optical path deflecting means is arranged between the lenses of the second lens group.

Further, a second means for decreasing the size of the projection type color image display apparatus is as follows.
(4) When the projection optical unit includes two lens groups, optical axes of the first and second lens groups are separated from each other. That is, the second lens group is shifted with respect to the first enlarged image and the enlarged image on the screen is formed through the deflecting mirror so that the size is decreased.
(5) When the projection optical unit includes two lens groups, the first lens group is arrange parallel to a horizontal direction of an image forming area of the screen. Further, the optical path deflecting means is arranged between the first and second lens groups while the second lens group is arranged substantially perpendicular to the horizontal direction of the image forming area of the screen (that is, the optical axes of the first and second lens groups are perpendicular to each other). Further, the enlarged image on the screen is formed through the deflecting mirror so that the size is decreased.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 9 is a table showing lens data of first lens group of a projector optical unit as a first embodiment of the invention.

FIG. 12 is a table showing lens data of second lens group of the projector optical unit as the first embodiment of the invention.

DETAILED DESCRIPTION OF THE INVENTION

A projection type image display apparatus and a rear projection type image display apparatus in each of which a projector optical unit of the invention is used is described below with reference to the drawings.

Figure 1:
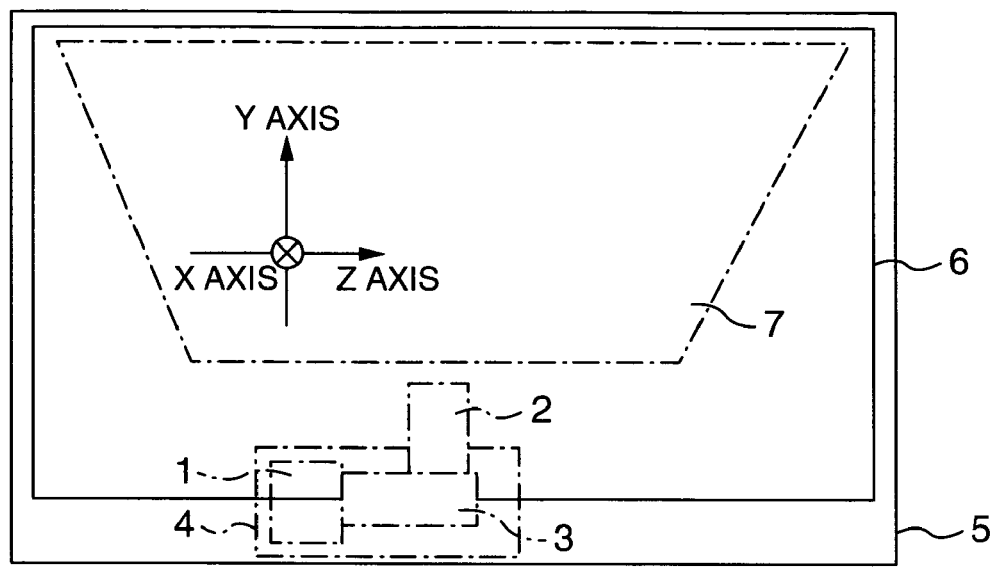
FIG. 1 is a front view showing a rear projection type image display apparatus as a first embodiment of the invention.

FIG. 1 is a front view showing a first embodiment of the rear projection type image display apparatus in which the projector optical unit of the invention is used. In this drawing, 1 denotes an irradiating optical system, 5 denotes a casing, 6 denotes a screen, 7 denotes a beam passage deflecting mirror, 4 denotes an optical unit for projecting, by irradiating through the irradiating optical system 1 an image display element (not shown) with a light from a white light source, an optical image formed on the image display element in accordance with imaging signals while enlarging a size of the optical image. Further, 3 denotes a first lens-barrel including a first positively-refractile lens group (as described above), and 4 denotes a second lens-barrel including a second positively-refractile lens group (as described above). The optical unit 4 is incorporated with an electric power source, a display drive circuit and so forth (not shown) in a chassis (not shown), so that a projection type image display apparatus is formed. Hereafter, the projection type image display apparatus is represented by the optical unit 4.

Figure 2:
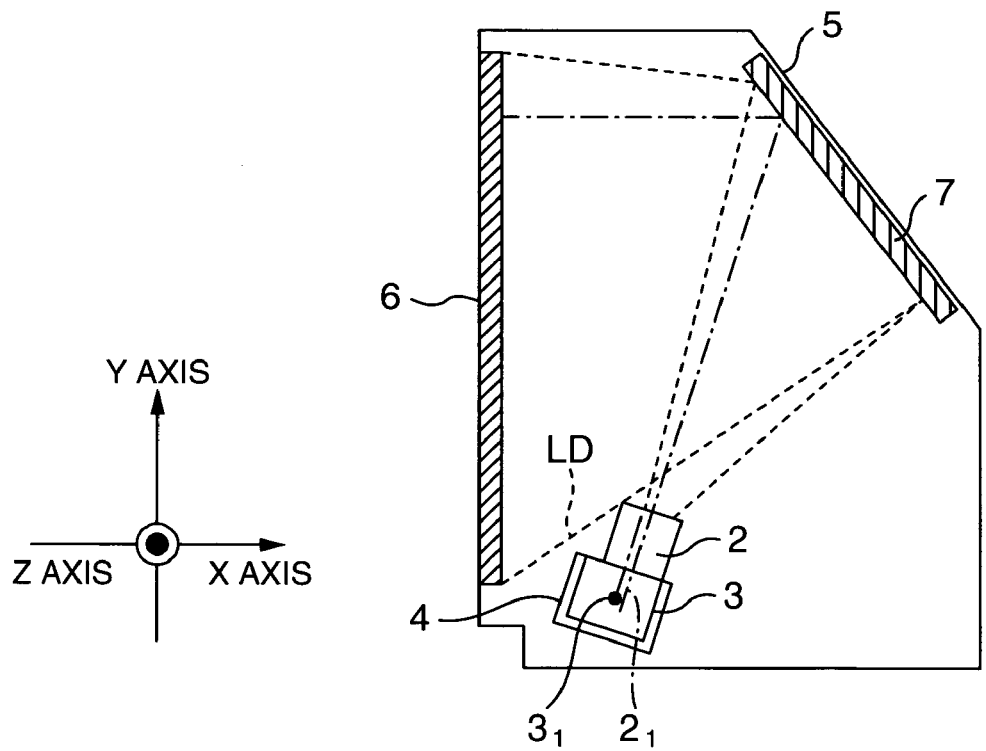
FIG. 2 is a side view showing a rear projection type image display apparatus as a first embodiment of the invention.

The optical unit 4 is arranged at a lower portion of the casing 5 as shown in FIG. 2, and the light of image projected therefrom is deflected by an optical path deflecting mirror 7 to be projected on a screen 6 from a rear surface side of the screen 6.

The projecting optical unit 4 of the invention includes the first lens group incorporated in the first lens-barrel 3 arranged in such a manner that an optical axis thereof is substantially parallel to a horizontal direction of an image forming surface of the screen 6, and the second lens group incorporated in the second lens-barrel 2 arranged in such a manner that an optical axis thereof is substantially perpendicular to the optical axis of the first lens group. Further, the projecting optical unit 4 includes a optical path deflecting means (described below) at a joint portion between the first and second lens groups for deflecting the optical path to guide the light of image from the first lens group to the second lens group.

As described above, the projecting optical unit 4 of the invention is divided to two lens groups in such a manner that the optical axes thereof are substantially perpendicular to each other. Since the optical axis of the first lens group is arranged to be parallel to the horizontal direction of the image forming surface of the screen 6, a depth of a rear projection type image display apparatus can be decreased, and a height of the projecting optical unit can be decreased. Therefore, the projecting optical unit 4 of the invention is effective for miniaturizing the whole of the set. A case in which the light source is a light source lamp for horizontal lighting, and the light source lamp is arranged to be substantially parallel to the horizontal direction of the image forming surface, is particularly effective.

For making the explanation easy hereafter, a right hand orthogonal coordinate system is applied. In FIG. 1, the screen 6 is parallel to YZ plane, the horizontal (transverse) direction is Z axis direction, and a vertical direction is Y axis direction. A direction extending through the screen 6 from a front side (a viewer side) to the rear surface is X axis direction.

FIG. 2 is a side view of the rear projection type image display apparatus using the projecting optical unit of the invention, and common elements of respective common functions have respective common denoting signs. In FIG. 2, an optical axis $3_1$ (Z axis in this drawing, hereafter called as an optical axis of the first lens barrel) of the first lens group incorporated in the first lens barrel 3 and an optical axis $2_1$ (hereafter called as an optical axis of the second lens barrel) of the second lens group incorporated in the second lens barrel 2 are arranged to perpendicular to each other in the incorporated optical path deflecting means. Further, the optical axis $2_1$ of the second lens barrel 2 is decentered with respect to the optical axis $3_1$ of the first lens barrel 3 substantially in X axis direction toward a right side of the drawing, so that the optical unit of the projector optical unit is decentered with respect to the screen 6. Therefore, an angle between the X axis and a light beam LD proceeding from the optical path deflecting mirror 7 toward an lower end of the screen 6 is increased. Therefore, a position of the optical unit 4 can be raised in Y axis direction as a vertically upper direction of the image forming surface, so that the second lens barrel 2 can be arranged at a position vertically higher than a lower end of the screen 6. By this arrangement, the compact set in which a distance between the lower end of the screen and a bottom surface of the casing 5 is small can be obtained.

Figure 3:
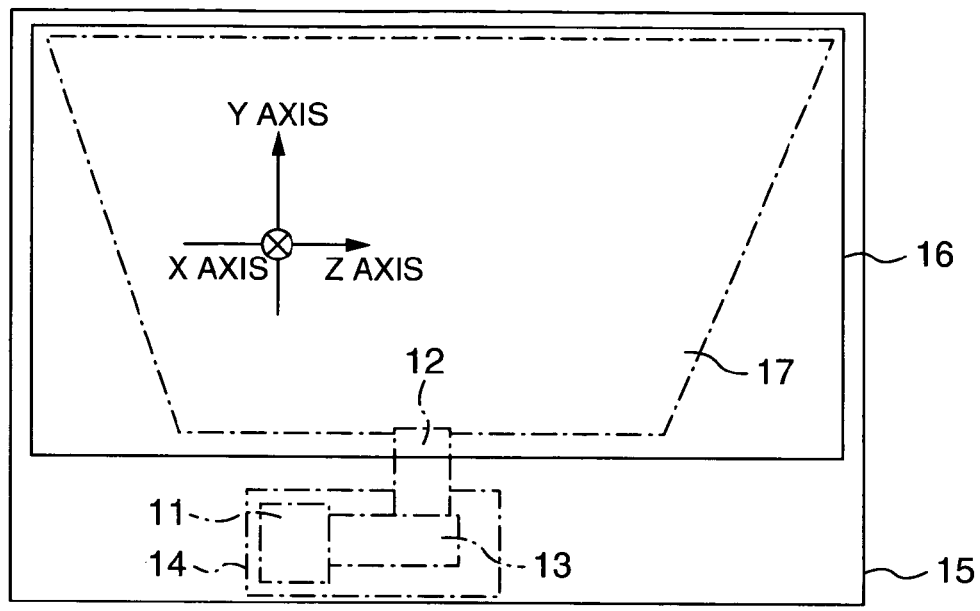
FIG. 3 is a front view showing a rear projection type image display apparatus as a second embodiment of the invention.

FIG. 3 is a front view regarding the second embodiment of the rear projection type image display apparatus using the projecting optical unit of the invention. In this drawing, 11 denotes an irradiating optical system, 15 denotes a casing, 16 denotes a screen, 17 denotes an optical path deflecting mirror, and 14 denotes an optical unit. Further, 13 denotes a first lens-barrel including a first lens group, and 12 denotes a second len-barrel including a second lens group. A axis of the first lens-barrel 13 is arranged to be substantially parellel to a horizontal direction (Z axis in the drawing) of the image forming surface of the screen 16 similary to the first embodiment, so that it is effective for miniaturizing the whole of the set.

Figure 4:
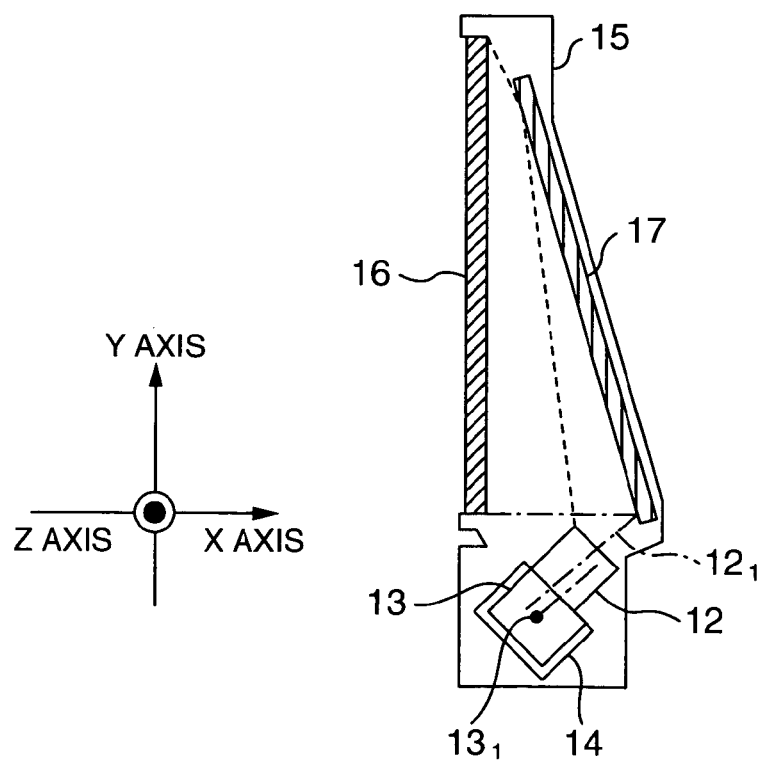
FIG. 4 is a side view showing a rear projection type image display apparatus as a second embodiment of the invention.

FIG. 4 is a side view of the second embodiment of the rear projection type image display apparatus using the projecting optical unit of the invention, and common elements of respective common functions between this drawing and FIG. 3 have respective common denoting signs. An optical axis $13_1$ (Z axis in this drawing) of a first lens-barrel 13 and an optical axis $12_1$ of a second lens-barrel are arranged to be perpendicular to each other by an incorporated optical path deflecting means. Further, the optical axis $12_1$ of the second lens-barrel 12 is decentered with respect to the optical axis $13_1$ of the first lens-barrel 13 in a reverse direction with respect to the direction in FIG. 2 (that is, substantially in the X axis direction toward a left side of FIG. 4), and a projecting length of the second lens unit 12 is decreased. Whereby, a distance between a vertical direction and an arranged direction of the optical path deflecting mirror 17 is decreased to decrease an angle with respect to the screen 16 is decreased. Further, an arranged position of the optical path deflecting mirror 17 is made closer to the screen to decrease directly the depth of the set, so that the compact set can be obtained, incidentally, in this case, a height of the casing 15 is increased.

Figure 5:
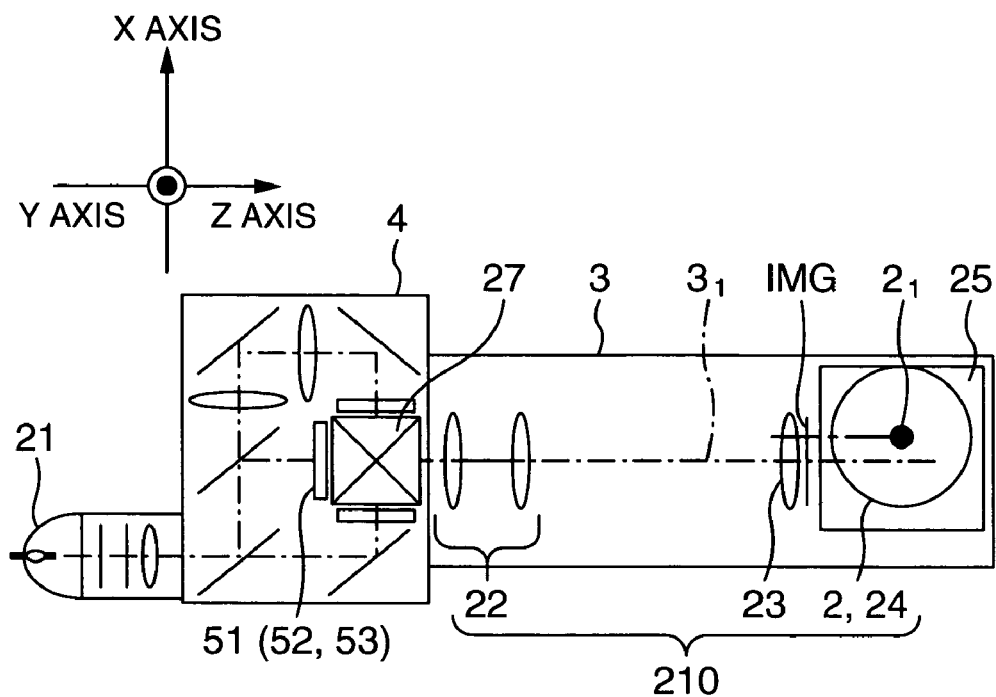
FIG. 5 is an upper view showing a projection type image display apparatus as a first embodiment of the invention.

Next, a structure of the projecting optical unit of the projection type image display apparatus of the invention used the above described first embodiment is described in detail with reference to FIG. 5. As required from convenience for explanation, the common elements for the respective common functions between FIGS. 1 and 5 are denoted by the respective common denoting signs.

In this drawing, the optical unit in which 21 denotes a white lamp as the light source, and 4 denotes a transmissive liquid crystal display panel 51 (52, 53) is shown.

The light from the white lamp 21 is polarized, converted and divided by an irradiating optical system to irradiate the transmissive liquid crystal display panel 51 (52, 53). On the transmissive liquid crystal display panel 51 (52, 53), an optical image is formed while a strength of an irradiating light of each color is adjusted. The optical images of the respective colors are combined with each other by a cross-prism 27 to form a multicolor image to be enlarged by a projector optical unit 210.

The projector optical unit 210 includes a first positively-refractile lens group 22 incorporated by the first lens barrel 3, field lens 23, and a second positively-refractile lens group 24 incorporated by the second lens barrel 2. A optical path deflecting means 25 for deflecting and guiding the light of image from the first lens group 22 and the field lens 23 to the second lens group 24 is arranged at the joint portion between the first and second lens barrels 2 and 3. Incidentally, $3_1$ and $2_1$ denote the optical axes of the first and second lens barrels 3 and 2 respectively. Further, the field lens 23 may be a lens group including a plurality of lenses, although single lens is shown in FIG. 5.

In the invention, the image as the combination by the cross-prism 27, is formed as an enlarged image (inverted image as denoted by IMG in FIG. 5) by the first lens group 22 in the vicinity of the field lens 23. The optical axis $21$ of the second lens group 24 is arranged substantially perpendicular to the optical axis 31 of the first lens group 22 through the optical path deflecting means 25, while being decentered in, for example, substantially a positive direction along the X axis (toward right side of FIG. 2).

Since F value of the irradiating optical system is approximately from 2.0 to 3.0, F value of the first lens group 22 needs to be the approximately same degree to take in the luminous flux with high efficiency. When an effective image forming area of the transmissive liquid crystal panel is 0.7 inch, and an expansion rate MI of the first lens group is 3 times, the enlarged image in the vicinity of the field lens 23 has a size of 2.1 inch. In this case, since an incidence angle of the luminous flux as seeing a matter (the image enlarged (IMG in the drawing) by the first lens group 22) from the second lens group 24 is inversely proportional to the expansion rate M, a theoretical F value of the second lens group 24 is approximately 9.0. Therefore, an angle of field by the second lens group 24 can be a super wide angle. If a diagonal width across corners of the screen is 50 inches, an expansion rate M2 of the second lens group 24 is approximately 24 times. That is, the expansion rate M1 of the first lens group 22 is smaller than the expansion rate M2 of the second lens group 24.

Further, the projection type optical unit 210 of the invention has first and second positively-refractile lens groups. Therefore, the image as the combination by the cross-prism 27 is formed as the inverted image (a first enlarged image) in the vicinity of the field lens 23 by the first lens group 22, and this inverted image is projected onto the screen as an erect image (a second enlarged image) by the second lens group. Although the image projected on the screen is inverted with respect to the image on the image forming element in general projection type image display apparatus, the corresponding image of the invention is erect.

In the projection type image display apparatus as shown in FIG. 5, the transmissive liquid crystal panel as the image forming element for the cross prism for combining the images is arranged in such a manner that a horizontal direction of the image forming face is along XY plane, because a dimension of the cross prism is determined in accordance with a dimension of the image forming face in a direction in which an aspect ratio of the image forming face is relatively short, so that a back-focus of the projecting lens can be decreased. Therefore, the cross-prism can be miniaturized to effectively decrease a cost. Further, the optical axes of the light source lamp 21 and the second lens group 24 can be substantially perpendicular to each other. Therefore, as shown in FIGS. 1 and 2, when the rear projection type image display apparatus is constructed by using the projection type image display apparatus, the light source lamp for horizontal irradiating may be arranged substantially parallel to the horizontal direction of the image forming face. Therefore, when an elevation angle of the projection type image display apparatus is changed on XY plane, a layout in the set can be determined without a deterioration in length of life of the lamp.

Figure 6:
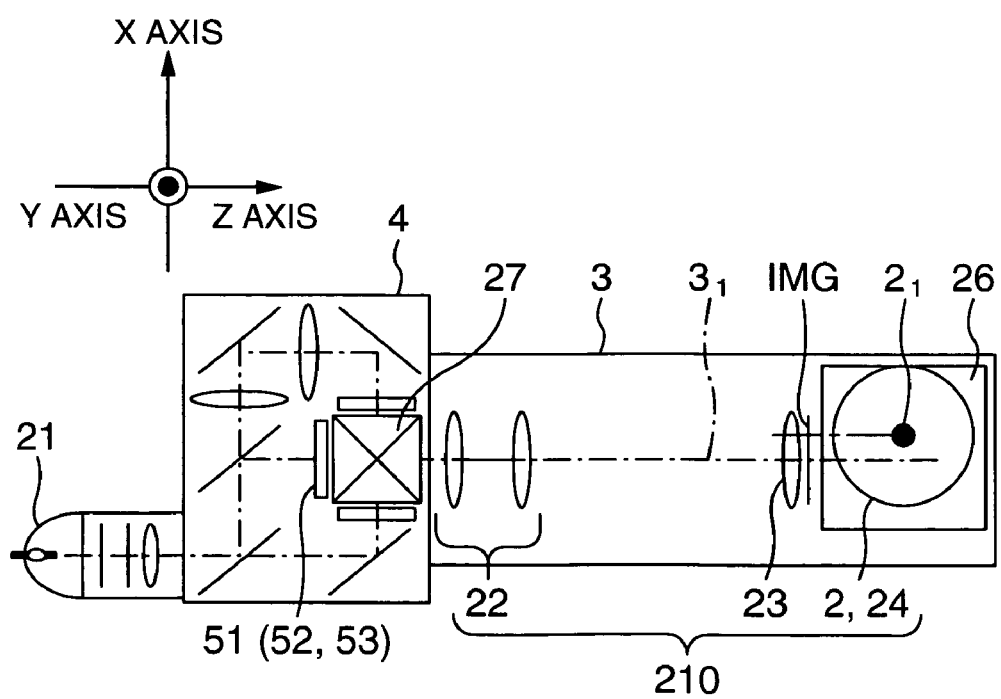
FIG. 6 is an upper view showing a projection type image display apparatus as a second embodiment of the invention.

FIG. 6 shows an embodiment in which a total reflection mirror is used as the optical path deflecting means 26 between the first and second lens groups. In this drawing, the common elements of the respective common functions have the respective common denoting signs between FIGS. 5 and 6, and an explanation is eliminated because of the common functions of the respective common elements between FIGS. 5 and 6.

In the projection type image display apparatus as shown in FIGS. 5 and 6, the optical axis $2_1$ of the second lens group 24 is decentered from the optical axis $3_1$ of the first lens group 22 in, for example, substantially a positive direction along the X axis on the XZ plane (toward right side in FIG. 2). Therefore, the compact set in which a distance between the lower end of the screen and the bottom surface is short as shown in FIG. 2 can be obtained. Further, by decreasing the projecting length by the second lens group and decentering it toward a reverse side with respect to the above side (toward left side of FIG. 4), the compact set as shown in FIG. 4 can be obtained.

That is, by changing only the projecting length by the second lens group and a decentering amount there between while the irradiating optical system and the first lens group are commonly used, the sets significantly different in form from each other can be obtained. Therefore, an expansion of variety of the set can be obtained with minimum cost for molding so that a development efficiency is improved.

Further, by decentering the optical axis $2_1$ of the second lens group 24 from the optical axis $3_1$ of the first lens group 22 in, for example, Z axis direction on XZ plane, the second lens group does not need to be arranged at a center of the screen image forming face. Therefore, a degree of freedom in layout of the set interior is increased to obtain the compact set.

On the other hand, even when an effective size of the image forming face of the transmissive liquid crystal panel is changed, it can be applied to the set of same form by only changing a part of the irradiating optical system and the first lens group. Therefore, the projector optical unit advantageous in efficiency of developing the set is obtainable.

The expansion rate of the image to be enlarged by the first lens group is changed in accordance with the effective size of the image forming face of the image forming element to be used, preferably from 2 times to 7 times. For limiting a distance between the image focus location and the first lens group to an optimum range and limiting outer shapes of the lenses of the first and second lens groups to a manufacturable range, it is preferable from 2 times to not more than 5 times.

Further, in the embodiments shown in FIGS. 5 and 6, the optica axis of the second lens group 24 is decentered from the optical axis of the first lens group 22 on XZ plane while determining appropriately the decentering amount. By this, as shown, for example, in FIG. 1, the decentering amount with respect to the transmissive screen 6 is changeable as desired. Therefore, under the same size of the image forming face, the form of the set can be changed freely to improve significantly a degree of freedom on design.

Figure 7:
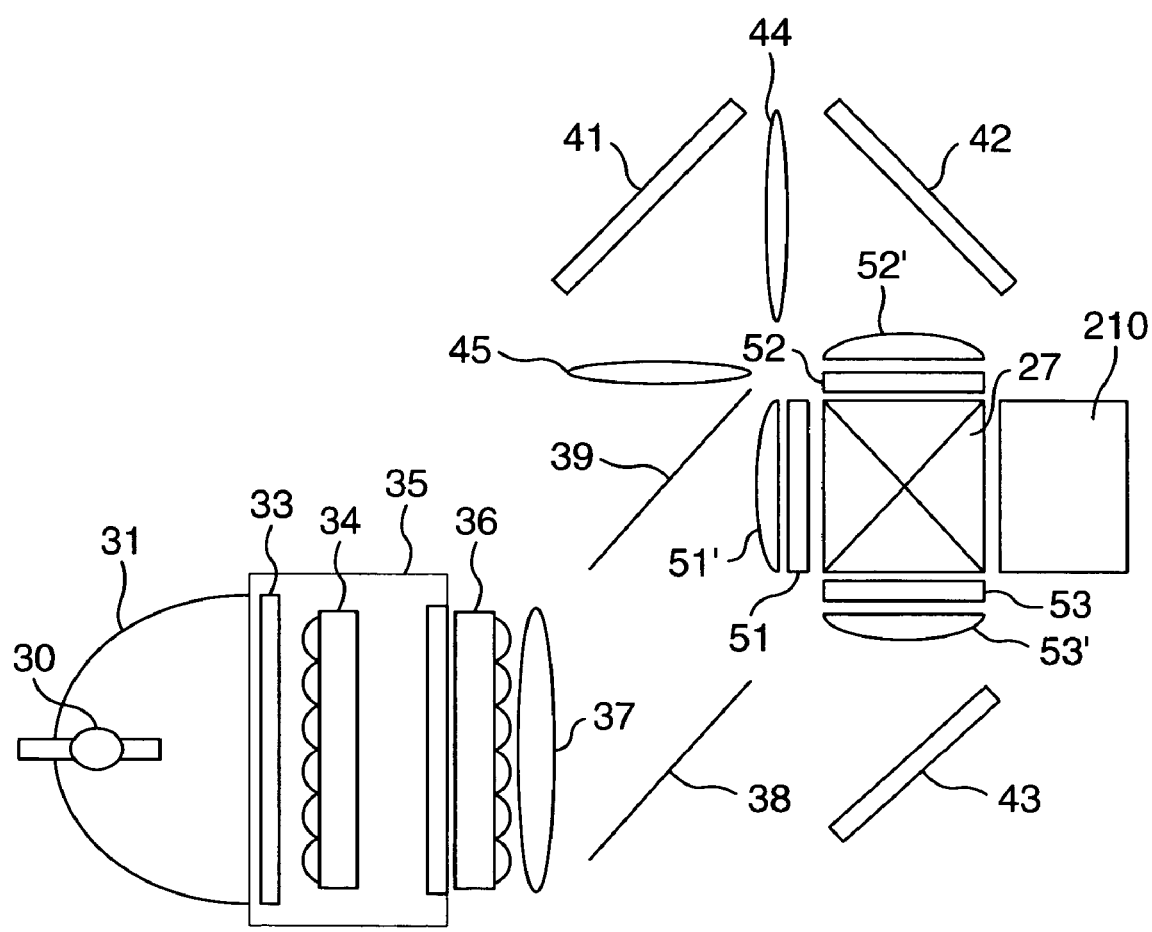
FIG. 7 is a schematic view showing an irradiating optical system of the projection type image display apparatus as the first embodiment of the invention.

FIG. 7 is a view showing an arrangement of the irradiating optical system when the transmissive liquid crystal panel is used as the image forming element in the projection type image display apparatus of the invention used in the above described first embodiment.

The while luminous flux emitted from the lamp 30 as the white light source is reflected by a reflector 31 to pass as a desired luminous flux through an explosion-protection glass 33. This luminous flux is divided by a fly-eye-lens 34, and polarized by a polarizing beam splitter 35 to generate a plane-polarized light. The divided luminous flux as the plane-polarized light is expanded and projected by a fly-eye-lens 36 and a field lens opposed to each other onto a liquid crystal panel (G) 51, a liquid crystal panel (B) 52 and a liquid crystal panel (R) 53, and combined with each other. Therefore, a distribution in energy of the luminous flux emitted into the panel is made constant. Further, the white luminous flux is divided by a dichroic mirror 38 on the optical path to a red luminous flux and a cyan luminous flux. A chromaticity of the red image light is improved in color purity by a spectro-reflection characteristic of the dichroic mirror 38 and a spectro-reflection characteristic of a trimming filter arranged on a lens 53'.

Further, a dichroic mirror 3 has a characteristic of reflecting a light of green range. And, a trimming filter is used as a lens 51' similarly to the case of the red light. A blue luminous flux as a remainder is extracted by the characteristic of the dichroic mirror 3 arranged on, for example, the mirror 41 or 42 or the lens 52'. A side of shorter wavelength is cut off by the UV cut filter on the fly-eye-lens 34 and the lens 44.

The above explanation is for a color separating part of the irradiating optical system of the invention in which the transmissive liquid crystal panel is used as the image display element. The red, green and blue luminous fluxes separated from each other by the above described technical means are emitted onto the transmissive liquid crystal panels 53, 51 and 52 corresponding to respective colors, and amounts of the luminous fluxes (light intensities) emitted therefrom are adjusted by image signals. The adjusted luminous fluxes of the respective colors are combined with each other by the cross-prism 27 to be projected onto the screen by the projector optical unit 210 while being enlarged.

Figure 8:
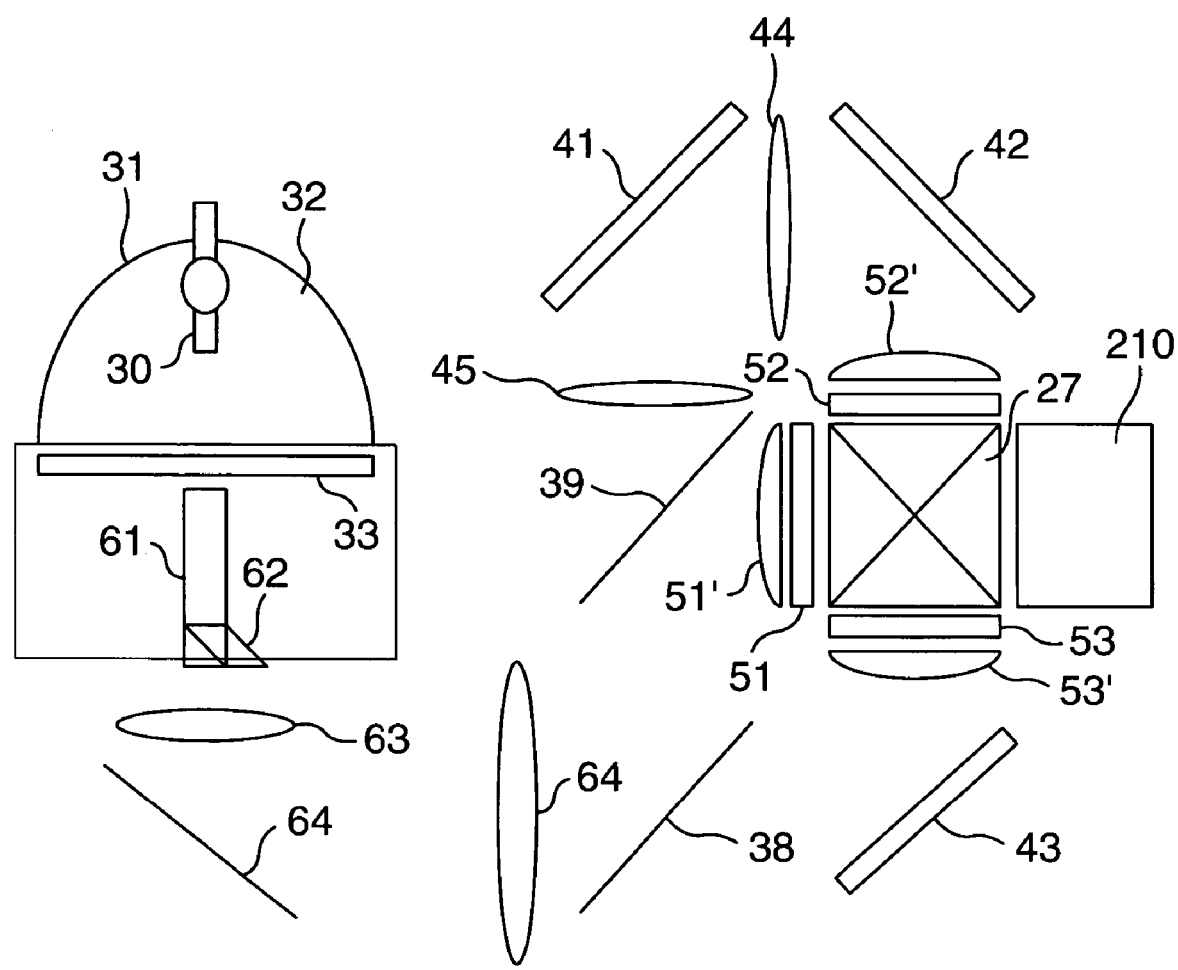
FIG. 8 is a schematic view showing an arrangement in an irradiating optical system of the projection type image display apparatus as the second embodiment of the invention.

FIG. 8 is a view of an arrangement showing another embodiment of the irradiating optical system in which the transmissive liquid crystal panel is used as the image display element for the projection type image display apparatus. The white light flux emitted from the lamp valve ball 30 as the while light source is reflected by a reflector 31 and passes through an explosion-protection glass 33 as a converging luminous flux. This luminous flux after passing the explosion-protection glass 33 is reflected by a plurality of times in a light funnel 61 to be divided, and changed by a polarizing beam splitter 62 to the plane-polarized light. The luminous flux as the plane-polarized light after being divided is enlarged by enlarging lenses 63 and 64 to be projected onto a liquid crystal panel (g) 51, a liquid crystal panel (b) 52 and a liquid crystal panel (R) 53, and combined with each other. Therefore, a distribution of energy of the luminous flux emitted onto the panels are made constant. Functions and effects of the optical elements arranged at the downstream side with respect to this are equal to those of the embodiments of the forementioned irradiating optical system of FIG. 7, the denoting signs are commonly used, and the explanation is deleted.

The case in which the transmissive liquid crystal panel is used in the irradiating optical system of the invention has been described. As a matter of course, even when a reflector type liquid crystal panel as the image display element is used, the projector optical unit of the invention is usable at a downstream side with respect to a position where the image is synthesized.

The projector optical unit of the invention includes at least two lens groups, as described above. Since the field lens may be arranged at either of a position between the optical path deflecting means and the second lens group and a position between the optical path deflecting means and the first lens group, a degree of freedom for the layout is great. Incidentally, if the field lens is arranged between the optical path deflecting means and the second lens group, aperture diameters of the lenses of the field lens and the second lens group need to be great so that a cost is increased. Further, since a lens surface of the field lens is close to an image focus face of the first lens group, a contaminant on the lens surface of the field lens causes a deterioration of a quality of the enlarged image on the screen. Therefore, a care on design is necessary.

As described above, since the projector optical unit of the invention has the at least two lens groups and the cross-prism is arranged between the transmissive liquid crystal panel as the image display element and the first lens group 22 as shown in FIG. 5 or 6 to combining the images of respective colors, the first lens group is necessarily a retrofocus type. Further, since the luminous flux is substantially parallel in the irradiating optical system, a telecentric optical system is formed, and the enlarged image by the first lens group 22 is formed in the vicinity of the field lens 23.

Figure 10:
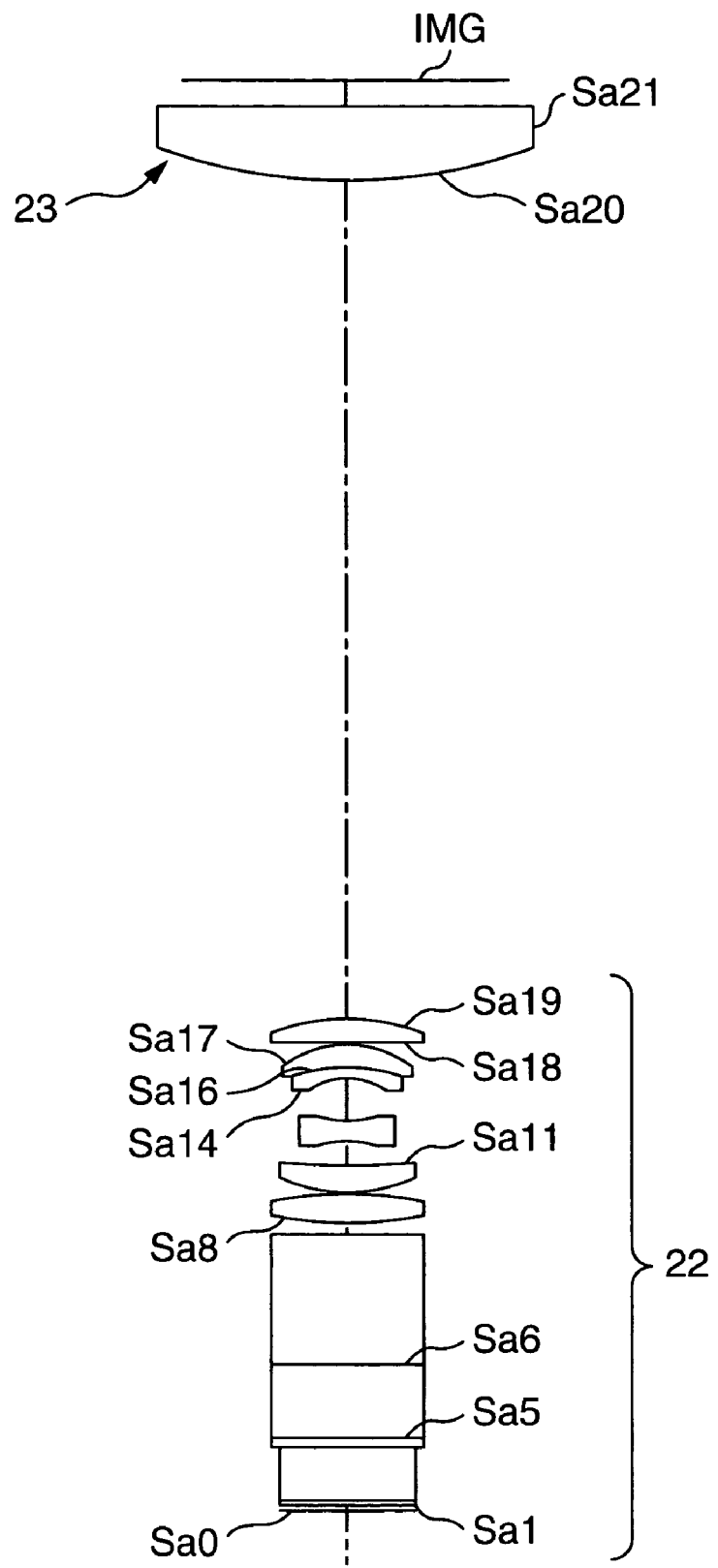
FIG. 10 is a schematic view showing an arrangement of lens of the first lens group of the projector optical unit as the first embodiment of the invention.

Lens data of the first lens group 22 as the embodiment of the projector optical unit of the invention is shown in FIG. 9, and lens arrangement thereof is shown in FIG. 10. Denoting signs attached to the lenses in FIG. 10 corresponding to lens face denoting signs in FIG. 9. Sa6 face and Sa7 face in FIG. 9 correspond to the cross-prism 27 (in FIGS. 5 and 6), the first lens group 22 corresponds to Sa8–18 faces, the field lens 23 corresponds to Sa20 face and Sa21 faces, and the first image focus location corresponds to Sa21 face shown as IMG in FIG. 10.

Figure 11:
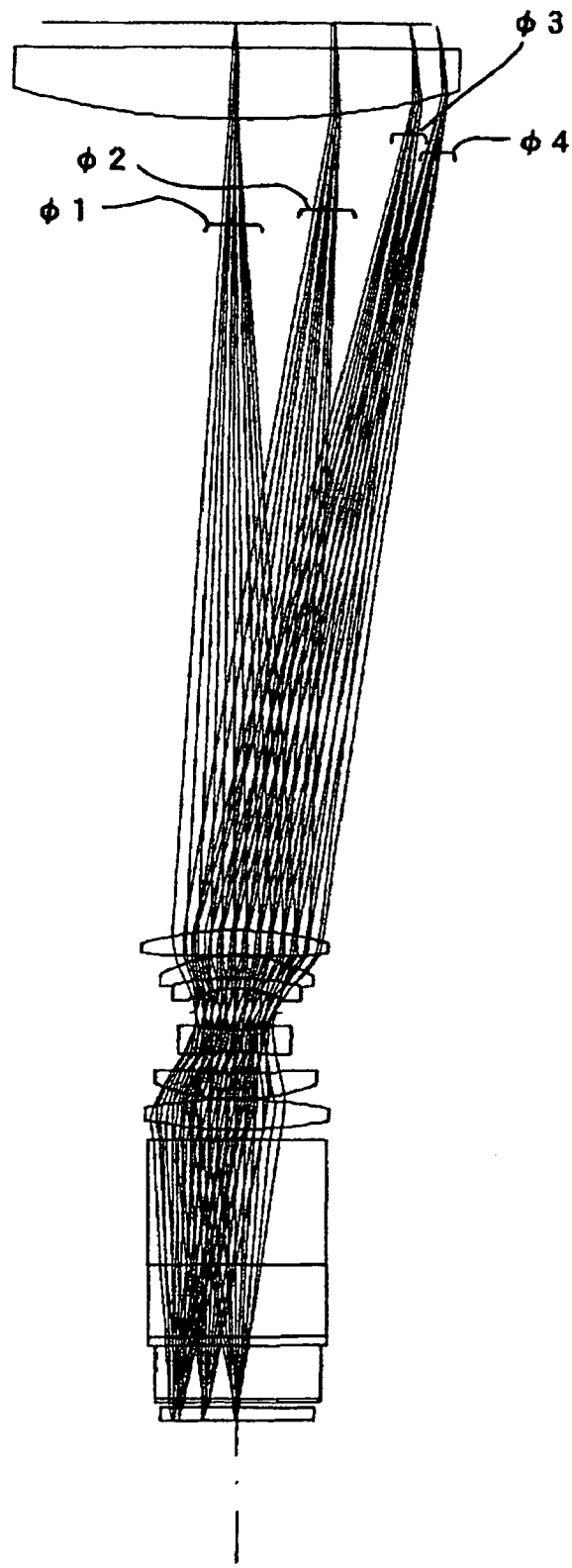
FIG. 11 is a schematic view showing proceeding courses of light beams set by the first lens group of the projector optical unit as the first embodiment of the invention.

FIG. 11 shows proceeding courses of light beams of luminous flux $\phi 1$ forming the image on the optical axis, luminous flux $\phi 2$ forming the image on an intermediate portion of the image, and luminous fluxes $\phi 3$ and $\phi 4$ forming the image on a peripheral portion of the image.

Figure 16:
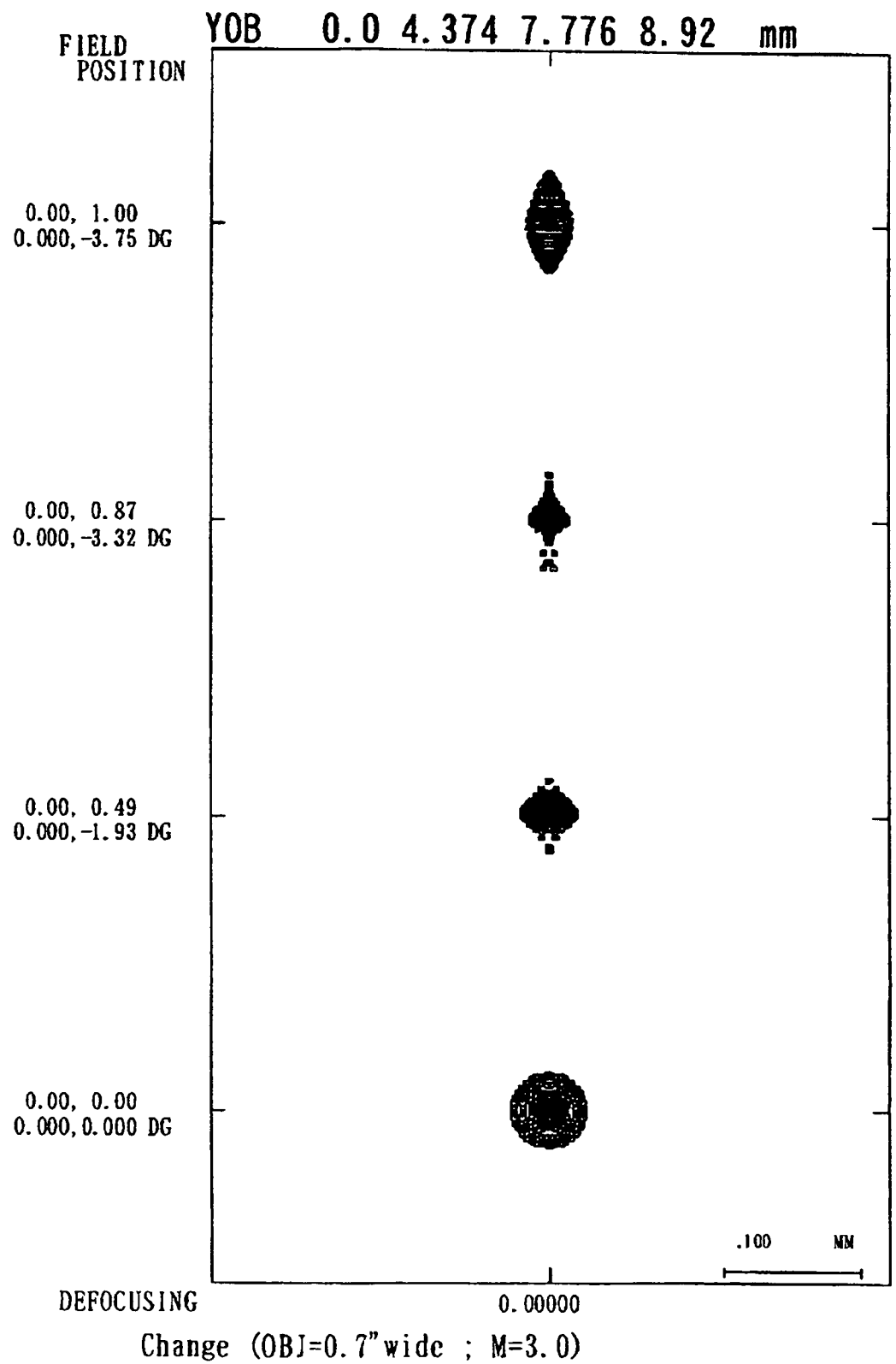
FIG. 16 is a schematic view showing shapes of spots formed on an image focus face by the first lens group of the projector optical unit as the embodiment of the invention.

FIG. 16 is a drawing of spots on the image focus face (IMG) for showing an image forming performance of the first lens group as the embodiment of the projector optical unit of the invention in a case where a panel size is 0.7 inch, and an aspect ratio is 16:9. An evaluation is performed by overlapping the blue light of wavelength 450 nm, the green light of wavelength 545 nm, and the red light of wavelength 625 nm with respect to each other. In the projector optical unit of the invention, the light beams are focused on a spot of size 50 μm, so that a good performance can be obtained.

Figure 13:
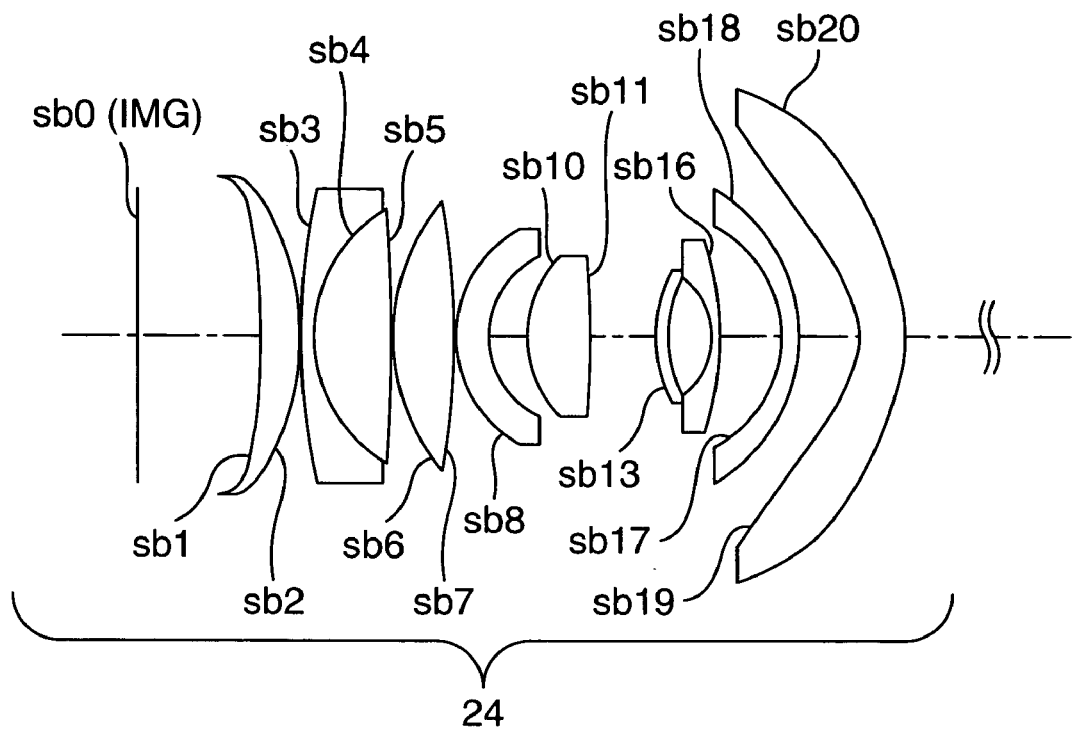
FIG. 13 is a schematic view showing an arrangement of lens of the second lens group of the projector optical unit as the first embodiment of the invention.

Next, lens data of the second lens group 24 as the embodiment of the projector optical unit of the invention with a super-wide-angle of view is shown in FIG. 12, and an arrangement thereof is shown in FIG. 13. Denoting signs attached to the lenses in FIG. 12 correspond to denoting signs of lens surfaces in FIG. 12. In FIG. 12, Sb0 face corresponds to the image focus face (IMG) of the first lens group and an object plane of the second lens group 24.

The second lens group 24 corresponds to Sb1–20 faces, and as a formula and coefficients showing an aspheric lens surface are shown in the drawing, a plastic aspheric lens includes six faces of Sb1, Sb2 faces, Sb15, Sb16 faces, and Sb19, Sb20 faces, that is, 3 lenses. Generally, F value of the first lens group is determined in accordance with F value of the irradiating optical system, and F value of the first lens group as the embodiment of the invention is 3.0. Further, since a projecting magnification is 3, the second lens group can take in a sufficient luminous flux even when F value thereof is 9.0. Further, since F value of the second lens group can be increased to 9.0, a projecting length from the final face (Sb20) to the screen is 425 mm and an angle of field is 113 degrees when the image of 50 inches is projected, so that the projector optical unit of the super wide field of view can be obtained.

Figure 14:
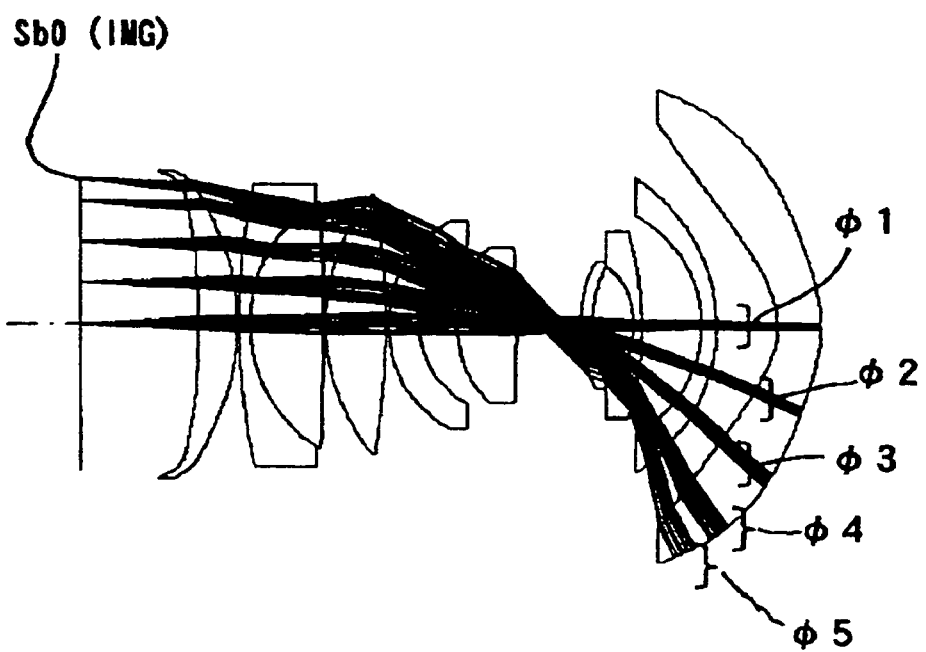
FIG. 14 is a schematic view showing proceeding courses of light beams set by the second lens group of the projector optical unit as the first embodiment of the invention.

FIG. 14 shows proceeding courses of light beams of the luminous flux φ1 forming the image on the optical axis, the luminous fluxes φ2 and φ3 forming the image on the intermediate portion of the image, and the luminous fluxes φ4 and φ5 forming the image on the peripheral portion of the image.

Figure 17:
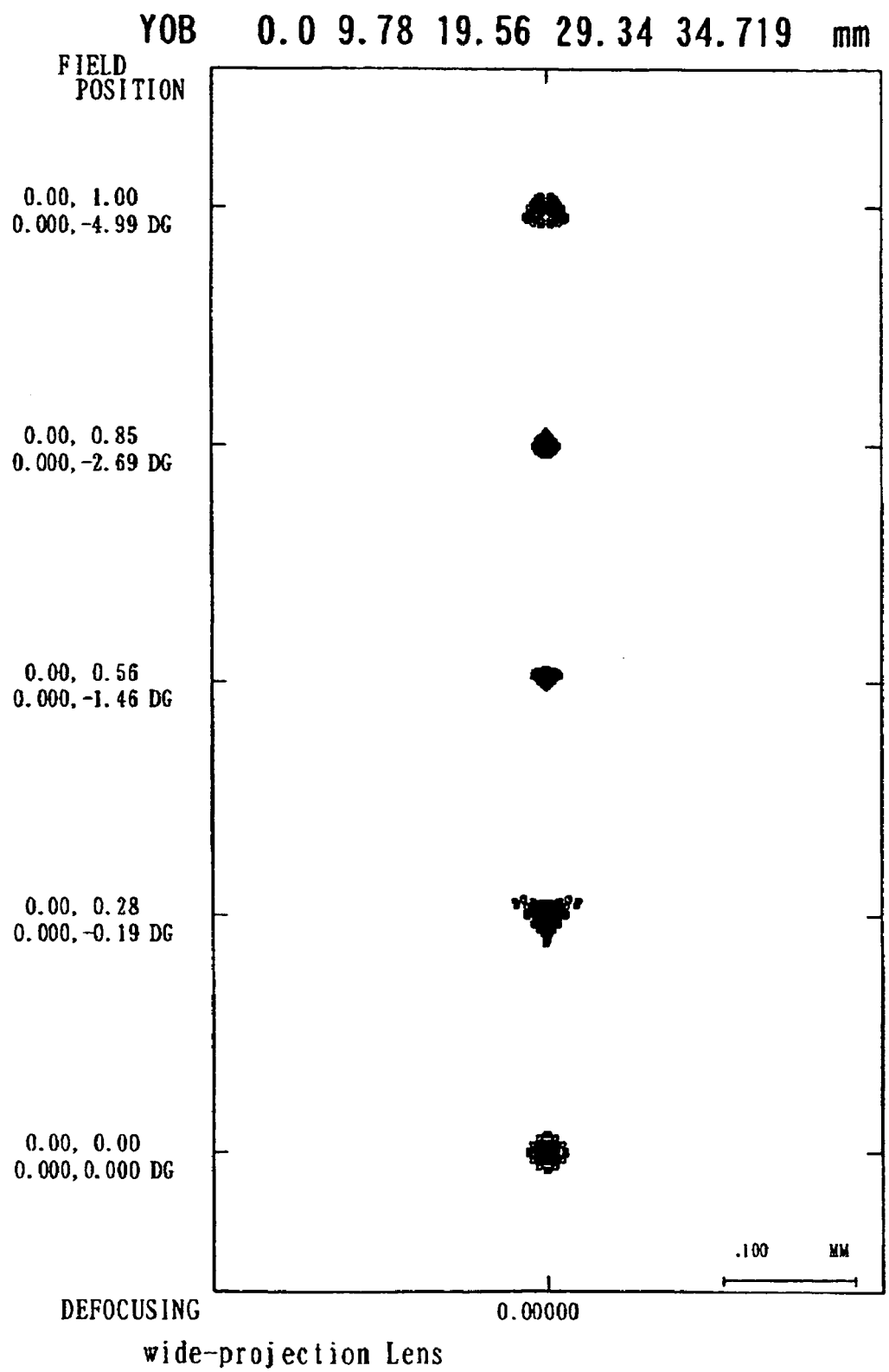
FIG. 17 is a schematic view showing shapes of spots formed on an image focus face by the second lens group of the projector optical unit as the embodiment of the invention.

FIG. 17 shows an image forming performance of the second lens group of the projector optical unit of the invention. This drawing is a view of spots on the screen obtained in a case where an object face is 2.1 inch, an aspect ratio is 16:9, and an eccentric amount is 7:1 to increase the object face. An evaluation is performed by overlapping the blue light of wavelength 450 nm, the green light of wavelength 545 nm, and the red light of wavelength 625 nm with respect to each other. The light beams are focused on a spot of size approximately 30 μm, so that a good performance can be obtained.

Figure 15:
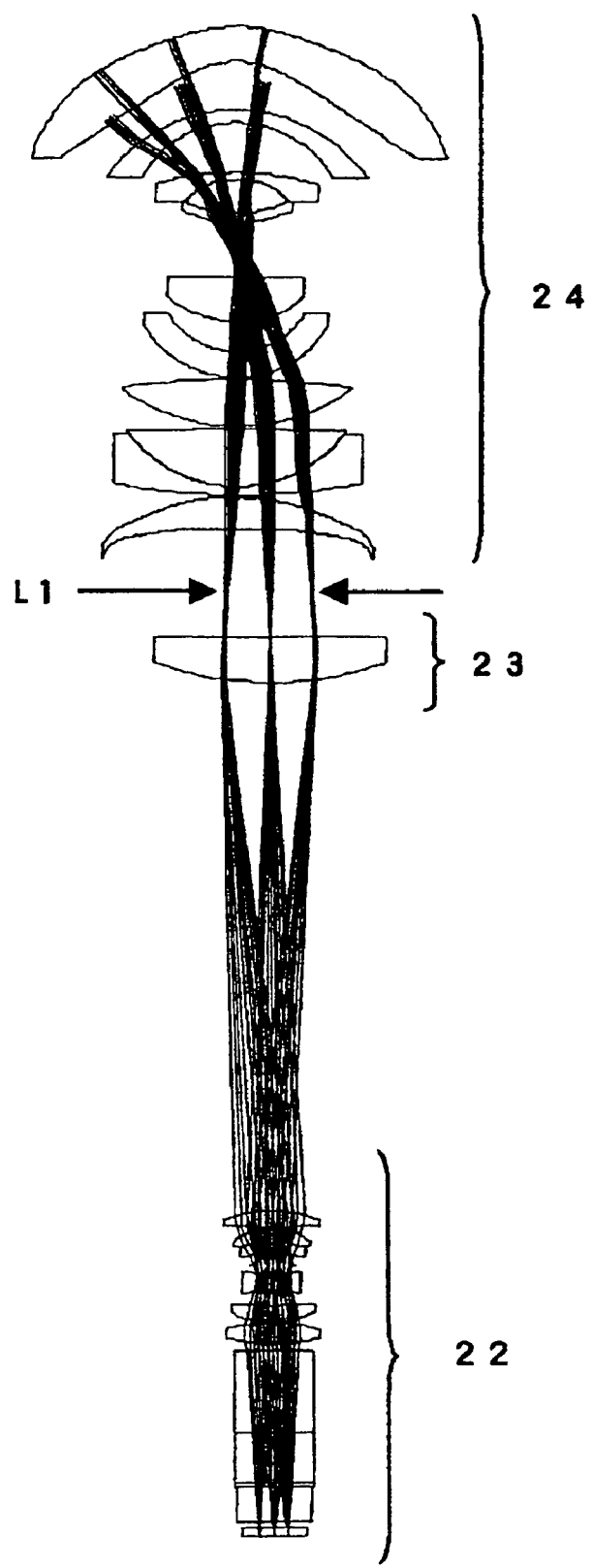
FIG. 15 is a schematic view showing proceeding courses of light beams set by the projector optical unit as the first embodiment of the invention.
Figure 18:
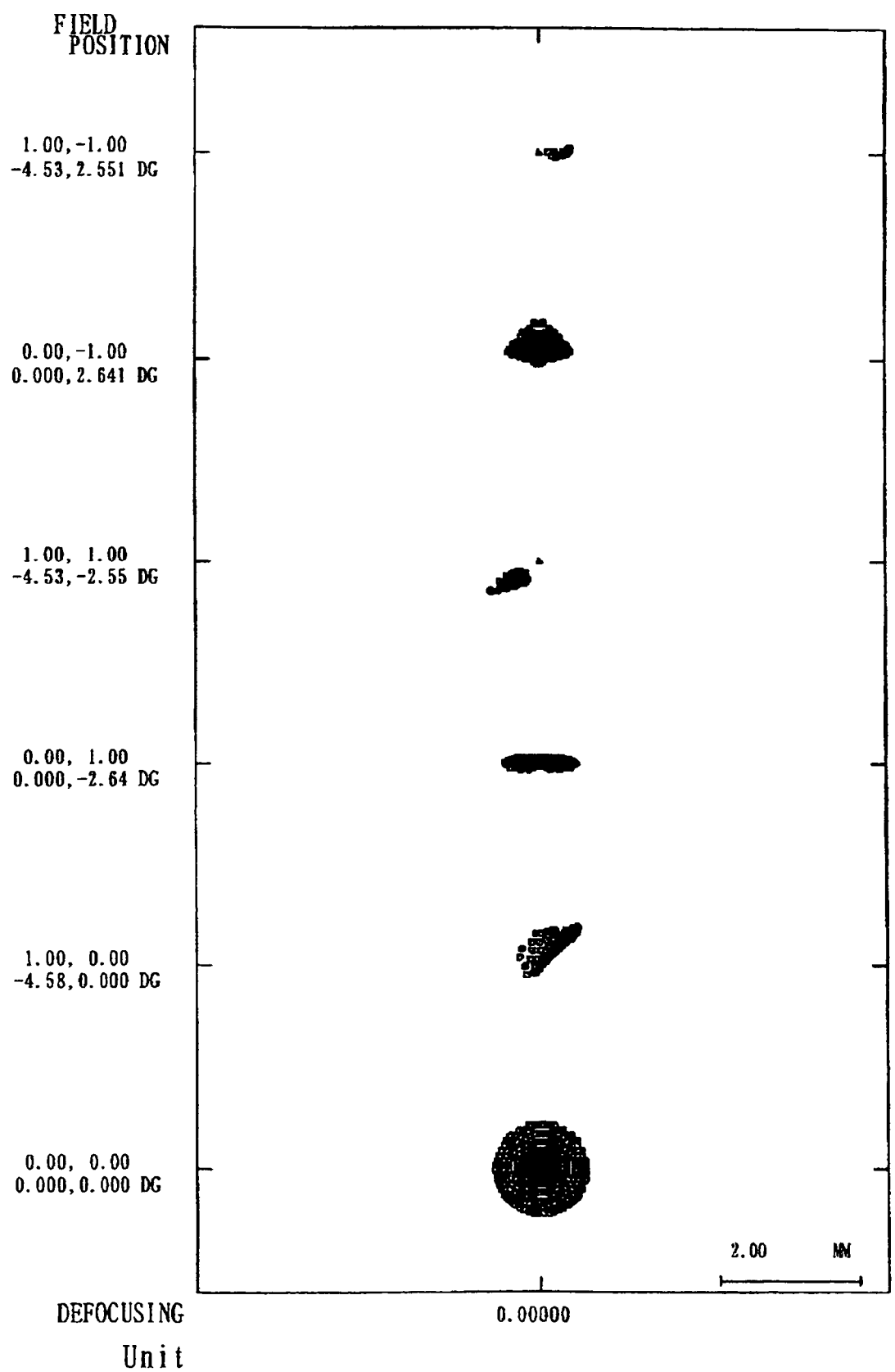
FIG. 18 is a schematic view showing shapes of spots formed on an image focus face by the projector optical unit as the embodiment of the invention.

FIG. 15 shows proceeding courses of light beams obtained when the optical axes of the second lens group 24, the first lens group 22 and the field lens 23 are decentered by a decentering amount L1 (7:1 with respect to a shorter side in aspect ratio of 16:9). Further, FIG. 18 is a view of spots on the screen obtained in a case where a size of the panel as the object face of the first lens group of the projector optical unit of the invention is 0.7 inch with an aspect ratio of 16:9, a size of the object face of the second lens group (the image focus face of the first lens group) is 2.1 inch with an aspect ratio of 16:9, and the decentering amount is 7:1 to increase the object face. An evaluation is performed by overlapping the blue light of wavelength 450 nm, the green light of wavelength 545 nm, and the red light of wavelength 625 nm with respect to each other. The light beams are focused on a spot of size approximately 1.8 mm in the projector optical unit of the invention, so that a good performance can be obtained.

As described above, in the projection type image display apparatus using the projector optical unit of the invention, even when a length to the reflecting screen is short, a sufficient enlarging ratio can be obtained so that a vigorous image can be enjoyed. Further, by using the projector optical unit of the invention in the rear projection type image display apparatus, the compact set including single deflecting mirror can obtained.

Incidentally, as a matter of course, the projector optical unit of the invention is applicable not only to the rear projection type image display apparatus, and also a front surface projecting type image display apparatus in which the image is projected onto a front surface of the screen.

As described above, by the projector optical unit of the invention, even when an enlarging rate is increased, super-wide angle of view and high accuracy in focusing necessary for miniaturizing the set can be obtained. Further, since a change of effective size of the image forming face of the image display element is accepted by partially changing the projector optical unit, a cost for developing of the image display apparatus and the rear projection type image display apparatus to modify the size of the set and modify a product series in response to the change in effective image forming size of the image display element can be reduced in comparison with the conventional art. As described above, the set can be miniaturized.

Figure 19:
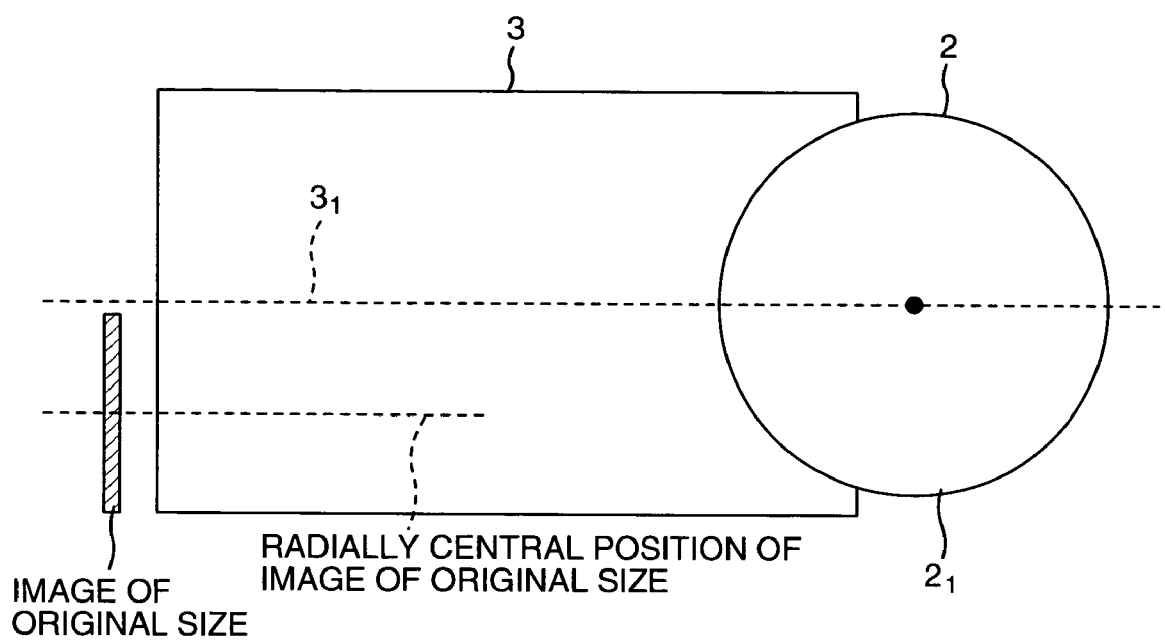
FIG. 19 is a schematic view showing a relation ship between a radially central position of an image of original size, an optical axis of a first lens group and an optical axis of a second lens group.

As shown in FIG. 19, when the optical axes of the first and second lens groups are coaxial with respect to each other, a radially central position of the image formed on an image focus location by the cross-prism 27 is prevented from arranged on the optical axis of the first lens group to obtain the same effect as the previous embodiments in which the optical axes of the first and second lens groups are decentered from each other while the radially central position of the image formed on the image focus location by the cross-prism 27 is arranged on the optical axis of the first lens group.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A projector optical unit for projecting an image onto a screen while magnifying a size of the image to be projected with respect to an original size of the image displayed by an image forming element, comprising,
   a group of lenses for magnifying the size of the image with respect to the original size thereof, and
   an optical path extending from the image forming element to the screen to transmit the image along the optical path,
   wherein the group of lenses includes a first part group of lenses for magnifying the size of the image to a first size enlarged with respect to the original size, and a second part group of lenses for further magnifying the size of the image to a second size enlarged with respect to the first size, and
   wherein an optical axis of the second part group of lenses is operable to be de-centered from a radially central position of the image of the first size corresponding to a radially central position of the image to be projected on the screen.

2. A projector optical unit according to claim 1, wherein an image focus location at which the image of the first size is capable of being formed is arranged between the first and second part groups of lenses.

3. A projector optical unit according to claim 1, wherein the group of lenses forms a telecentric optical system between the group of lenses and the image forming element.

4. A projector optical unit according to claim 1, wherein the first part group of lenses is detachably connected to the second part group of lenses.

5. A projector optical unit according to claim 1, wherein the image of the second size is an erect image with respect to the image of the original size displayed by the image forming element.

6. A projector optical unit according to claim 1, wherein the optical path is deflected between the screen and the image forming element.

7. A projector optical unit according to claim 1, wherein at least two image focus locations at each of which the image of respective one of the first and second sizes is capable of being formed are arranged along the optical path.

8. A projector optical unit according to claim 1, wherein the optical axis of the second part group of lenses is deflected between the first and second part groups of lenses.

9. A projector optical unit according to claim 1, wherein the optical axis of the second part group of lenses is capable of being prevented from passing an optical axis of the first part group of lenses.

10. A projector optical unit according to claim 1, wherein an optical axis of the first part group of lenses is capable of being prevented from passing a radially central position of the image of the original size corresponding to a radially central position of the image to be projected on the screen.

11. A projector optical unit according to claim 10, wherein the optical axes of the first and second part groups of lenses are coaxial with respect to each other.

12. A projector optical unit according to claim 10, wherein the optical axes of the first and second part groups of lenses are deflected between the first and second part groups of lenses.

13. A projector optical unit according to claim 1, wherein the group of lenses is positively-refractile.

14. A projector optical unit according to claim 1, wherein a magnifying power of the first part group of lenses is smaller than a magnifying power of the second part group of lenses.

15. A projector optical unit according to claim 1, wherein a field angle projected from the second part group of lenses is not less than 90 degrees.

16. A projector optical unit according to claim 1, further comprising a light source for emitting a luminous flux so that the image of the original size is irradiated by the luminous flux to be projected onto the screen, while a luminous intensity of the luminous flux applied to each pixel of the image forming element is adjustable in accordance with an amplitude of am image signal.

17. A projector optical unit according to claim 16, wherein the light source is capable of generating red, green and blue luminous fluxes.

18. A projector optical unit according to claim 16, wherein the light source includes a white light source, a luminous divider for dividing the white light to red, green and blue luminous fluxes to irradiate respective image forming element parts of the image forming element, and the unit further comprises an image combining device for combining red, green and blue images formed by the respective image forming element parts to form the image of the original size.

19. A projector optical unit according to claim 18, wherein the white light source includes one of an ultra-high pressure mercury lamp, a xenon lamp, and a metal halide lamp.

20. A projector optical unit for projecting an image onto a screen while magnifying a size of the image to be projected with respect to an original size of the image displayed by an image forming element, comprising, a group of lenses for magnifying the size of the image with respect to the original size thereof, and an optical path extending from the image forming element to the screen to transmit the image along the optical path wherein the group of lenses includes a first part group of lenses for magnifying the size of the image to a first size, enlarged with respect to the original size, and a second part group of lenses for further magnifying the size of the image to a second size, enlarged with respect to the first size,and wherein the group of lenses further includes a field lens for introducing the image of the first size into the second part group of lenses.

21. A projector optical unit according to claim 20, wherein an image focus location at which the image of the first size is capable of being formed is arranged between the field lens and the first part group of lenses.

22. A projector optical unit according to claim 20, wherein the field lens is positively-refractile.

23. A projector optical unit according to claim 20, wherein the optical path is deflected between the field lens and the second part group of lenses.

24. A projector optical unit according to claim 23, wherein the group of lenses further includes at least one of a total reflection mirror and a prism for deflecting the optical path between the field lens and the second part group of lenses.

25. A rear projection type image display apparatus comprising, an image forming element for forming an image of original size, an optically transmissive screen for displaying the image thereon, and a projector optical unit for magnifying a size of the image with respect to the original size of the image and projecting the image of the magnified size onto a rear surface of the screen, the projector optical unit including a first part group of lenses for magnifying the size of the image to a first size, enlarged with respect to the original size, and a second part group of lenses for further magnifying the size of the image to a second size, enlarged with respect to the first size, an optical axis of the second part group of lenses being operable to be de-centered from a radially central position of the image of the first size corresponding to a radially central position of the image to be projected on the screen.

26. A rear projection type image display apparatus according to claim 25, wherein the projector optical unit further includes an image focus location on which the image of the first size is capable of being formed, arranged between the first and second part groups of lenses.

27. A rear projection type image display apparatus according to claim 26, wherein a magnifying power of the first part group of lenses is smaller than a magnifying power of the second part group of lenses.

28. A rear projection type image display apparatus according to claim 26, wherein the first part group of lenses forms a telecentric optical system between the first part group of lenses and the image forming element, and a field angle projected from the second part group of lenses is not less than 90 degrees.

29. A rear projection type image display apparatus according to claim 26, wherein an optical axis of the first part group of lenses is arranged parallel to a horizontal direction of the screen.

30. A rear projection type image display apparatus according to claim 26, wherein the image forming element is capable of adjusting luminous intensities of respective three primary colors in accordance with an image signal to be applied to each pixel of the image forming element, and a luminous flux corresponding to the image is reflected by a mirror to be projected onto the rear surface of the screen.

31. A rear projection type image display apparatus according to claim 25, wherein the projector optical unit includes a first optical unit for guiding a luminous flux corresponding to the image in a direction parallel to a horizontal direction of the screen, a mirror for deflecting the luminous flux to proceed in another direction perpendicular to the horizontal direction of the screen, and a second optical unit for projecting the luminous flux deflected by the mirror onto the screen to form the image of magnified size on the screen.

32. A projector optical unit for projecting an image onto a screen while magnifying a size of the image to be projected with respect to an original size of the image displayed by an image forming element, comprising:

a first lens group for forming an intermediate image having a first size enlarged with respect to the original size, and as aspect ratio of 16:9 corresponding to the screen;

a second lens group arranged between the first lens group and the screen to magnify the size of the image to a second size enlarged with respect to the first size; and an optical path extending from the image forming element to the screen to transmit the image along the optical path.

* * * * *